May 5, 1964

TOKUJI KUMAMOTO ETAL 3,132,013

PROCESS FOR TREATING FEED WATER

Filed Sept. 26, 1960

INVENTORS
TOKUJI KUMAMOTO
KANESHI ABE
HANSABURO FUKUI
YOSHIHIRO MIYAMOTO

BY *Wenderoth Lind & Ponack*

ATTORNEYS

United States Patent Office 3,132,013
Patented May 5, 1964

3,132,013
PROCESS FOR TREATING FEED WATER
Tokuji Kumamoto, Tobata City, and Kaneshi Abe, Hansaburo Fukui, and Yoshihiro Miyamoto, Yawata City, Japan, assignors to Yawata Iron & Steel Co., Ltd., Tokyo, Japan, a corporation of Japan
Filed Sept. 26, 1960, Ser. No. 58,504
Claims priority, application Japan Oct. 3, 1959
2 Claims. (Cl. 55—53)

This invention relates to a process for removing oxygen dissolved in boiler feed water or the like, and more particularly, to a process for removing oxygen dissolved in cold feed water without heating it wherein a secondary gas, such as, nitrogen or hydrogen, which has a partial pressure lower than that of the oxygen dissolved in the water is blown into it so as to be placed in contact with the dissolved oxygen.

In general, it is known that dissolved gas, such as oxygen, carbon dioxide or ammonia is present in the feed water for a boiler or the like and is considered as a principal cause of corrosion in this equipment. Today the boiler feed water for a gigantic steam power plant operated at a high temperature and a high pressure is required to be so high in purity that the removal of corrosive dissolved gases is being carried out by either a heating or a reduced pressure process.

The apparatus for carrying out such processes is so complicated that it is not economical for treating feed water for use in a boiler of a compartively low pressure. In addition, it is rather difficult to use the water treated by the heating process as cooling water.

In the waste heat boiler for an oxygen top blowing converter for refining iron, the application of a hot deaerating process is so difficult and the corrosion thereof is so great that the operation of the converter is frequently interrupted.

A principal object of the invention is to overcome the above disadvantages and untlize the nitrogen which is a waste gas obtained in the production of a large amount of oxygen in a steel producing plant.

In accordance with the principle of the invention, a secondary gas which has an affinity for the oxygen dissolved in the boiler feed water or a cooling water is blown into said water, which is continuously agitated by the action of the secondary gas, and consequently, the dissolved oxygen is taken up by the secondary gas until the solution equilibrium according to Henry's law is established between the partial pressure of the oxygen in the secondary gas and the concentration of the oxygen dissolved in the water, whereby the oxygen dissolved in the water is reduced, and thus the water is purified. Either nitrogen or hydrogen is preferred as the secondary gas, which is preferably of neutral or reducing nature.

An object of the invention is to provide a method of protecting boilers, coolers and the like from corrosion and maintaining an extended life thereof by removing the oxygen, a principal cause of corrosion, dissolved in the boiler feed water and the like completely without heating it and while the feed water is at ambient temperature.

Another object of the invention is to provide a method of preventing the corrosion of the waste gas boiler used in an oxygen top blowing converter for refining iron, whereby the disadvantage resulting from the suspension of the converter operation necessitated by the repair of the boiler is minimized by the process of the invention which comprises deaerating the feed water in the cold state.

A further object of the invention is to provide a method of removing oxygen, a principal corrosive ingredient, dissolved in the water without heating while the water is in the cold state in a simple and easy manner so that the apparatus therefor is easily installed, whereby the cost thereof is reduced and the apparatus is simply controlled.

A still further object of the invention is to provide a method of utilizing nitrogen, a by-product resulting from the production of oxygen in a steel plant today, to advantage in which the nitrogen which has heretofore been thrown away as waste is employed in order to remove the dissolved oxygen, a principal cause of corrosion, from the water.

The accompanying drawings illustrate a preferred embodiment of the invention, in which.

Figure 1:
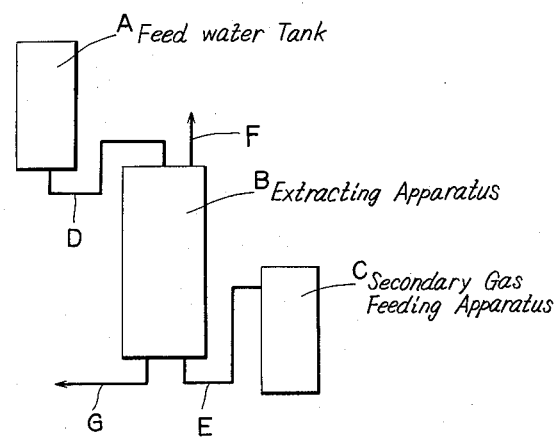
FIG. 1 is a diagrammatic view of an apparatus for carrying out the process of the invention.

FIG. 1 is the diagrammatic view of the preferred embodiment of the apparatus for carrying out the method of the invention, in which crude water is delivered into an extracting apparatus B through a conduit D from a feed water tank A. It is understood that it is not always necessary to supply the crude water to the extracting apparatus B from the feed water tank A as shown in the drawing. The extracting apparatus B may consist of a packed tower, or a temporary residence tank into which a jet of a secondary gas is directly blown, or a tank into which the crude water together with the secondary gas are simultaneously blown, or a combination of the above arrangements, so that the water to be treated is placed in intimate contact with the secondary gas in order to effect a complete diffusion of the dissolved oxygen into the secondary gas. There are shown a secondary gas feeding apparatus C, a gas feeding pipe E, a treated and purified water discharge outlet G and a secondary gas diffusing pipe F. It is understood that we can dispense with the secondary gas feeding apparatus, and use the gas feeding pipe E only.

In this preferred embodiment, when the crude water saturated with the dissolved oxygen is treated with the nitrogen gas of 99.7% purity, more than 98% of the dissolved oxygen can be removed. It is possible to carry out the process using an amount of nitrogen half as large as the amount of water to be treated. The deoxidizing efficiency can be increased, of course, by rendering the contact of the secondary gas with the crude water more complete, and also by increasing an amount of secondary gas in relation to the water.

Another preferred embodiment of the invention wherein the nitrogen by-product obtained from the production of oxygen in the steel plant is employed as a secondary gas will be described hereinbelow.

Figure 2:
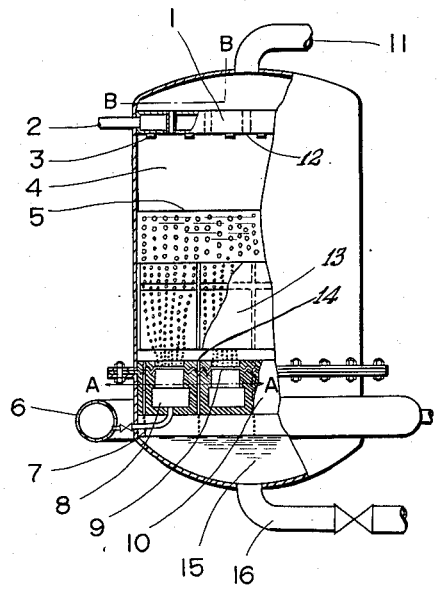
FIG. 2 is a front view, partly in section, of an apparatus embodying the invention.
Figure 3:
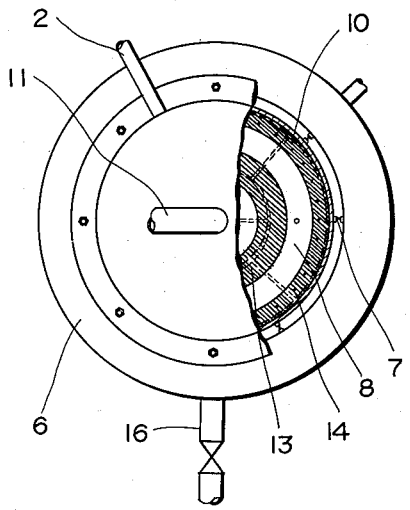
FIG. 3 is a partial sectional view on the line A—A of FIG. 2.
Figure 4:
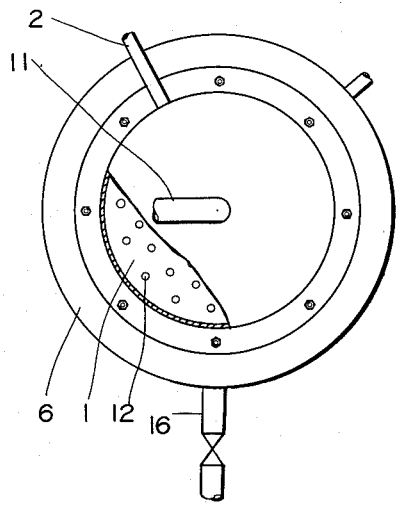
FIG. 4 is a partial sectional view on the line B—B of FIG. 2.

In FIGS. 2–4, inclusively, a water sprinkling disk 1 is provided over the whole surface of the upper part of a deaerating chamber 4. A number of water jet nozzles 3 are provided over the whole surface of the water sprinkling disk 1. A number of gas passage holes 12 are provided between the nozzles 3. A distributing disk 10 is provided in the lower part of the deaerating chamber 4. A circular inner gas chamber is provided within a circular outer gas chamber in such manner that both chambers are concentric. A number of passages 14 opening into the upper part are provided through the wall between the two concentric chambers 8. Each chamber 8 communicates with a secondary gas feeding pipe 6 through a conduit 7. The upper surface of each gas chamber 8 is covered with a porous plate 9. There are shown a partition plate fixture 13, a water feeding pipe 2, a vent 11, and a purified water discharge outlet 16.

The water sprinkling disk 1 blows a jet of crude water supplied by the water feeding pipe 2 into the deaerating chamber 4 through water jet nozzles 3. It is not always necessary that the supply of crude water should be provided by the nozzles. Instead, it may be carried out by a number of sprinklers or inlets. The water level 5 in the tower is adjusted to a fixed position, and prevents the deaerating chamber 4 from being filled with water in order to facilitate the escape of the secondary gas which is in equilibrium with the oxygen gas. The secondary gas or nitrogen to be blown into the water is delivered into the gas chamber 8 in the distributing disk 10 through the conduit 7 from the feeding pipe 6.

The cover of each gas chamber 8 is made of a porous material 9, for example, a fibrous cloth or other fine porous material, so that, when nitrogen passes through the porous material 9 of the cover, it is formed into a number of fine bubbles as it passes through the micropores. The partition plate fixture 13 is provided in order to effect a uniform expansion of bubble formation over the widest area, whereby undesirable phenomena, such as eddy currents and rocking which will cause segregation of the supplied gas, resulting from the fine bubbles issuing from the distributing disk 10, do not take place in the liquid in the deaerating chamber 4. The nitrogen gas which has thus extracted the dissolved oxygen from the crude water after the close contact with it passes through the gas passage holes 12 provided in the water sprinkling disk 1 from the space within the deaerating chamber 4 to escape from the exhaust vent 11. The treated and purified water is introduced into the water tank 15 through the passages 14 provided in the distributing disk 10 and collected from the discharge outlet 16.

An operation of the apparatus shows that when the crude water saturated with dissolved oxygen is treated with the nitrogen gas of 99.7% purity, then removal of more than 98% of the oxygen from the water is obtained by blowing the secondary gas only. The results are shown in the following table.

[Deoxygenating effect, percent]

| Tower Water Level, meters | 1.0 | 1.2 | 1.5 | 2.0 | 2.5 |
|---|---|---|---|---|---|
| Volume of Crude Water/ Volume of Gas Used: | | | | | |
| 2.0 | | | | 94.0-93.0 | 96.6-96.4 |
| 1.4 | | | 91.4-90.4 | 97.0-96.0 | 98.6-97.8 |
| 1.0 | 86.6-84.5 | 91.2-90.1 | 94.0-93.6 | 98.0-97.8 | 98.6-98.5 |

In the above table, the amount of dissolved oxygen in the crude water was 7.1 cc. per litre, the purity of nitrogen used was 99.7%, and the treated amount of water was 4 cubic meters per hour.

The following facts have been found to hold true from experience in operating the above process and apparatus of the invention.

(1) It is effective to carry out deoxygenation in the water column.

(2) Nitrogen to be blown into the crude water should be in the form of a bubble or blowhole as small as possible, because the bubble once blown into the water will never become smaller. Further, a number of bubbles blown into the water should not be collected together at once.

(3) The flow velocity of water is represented as in meters/hour, which should be less than 10.

(4) The optimum level of the water column in the tower is about 1500 mm.

(5) The inlet pressure at a nozzle for blowing nitrogen into the water should be more than 0.2 kg./cm.$^2$.

(6) The amount of nitrogen preferred is about 1.5 to two times the amount of water to be treated per unit time.

(7) It is preferred to maintain a vacuum above the water level at 60–100 mm. of water.

(8) The feeding of water into the tower should be by sprinkling.

(9) It seems impossible that carbon dioxide, one of the gases dissolved in the water, will not be removed simultaneously with the oxygen removal in accordance with the invention.

In accordance with the invention, water treatment can be done at room temperature. Accordingly, the thus treated water can be used not only for boilers, but also for coolers. The apparatus is so simple that the operation and maintenance thereof are easy, and besides, it can be installed at a low cost. The process and apparatus of the invention can be used for water treatment for use in a cooler and a low pressure boiler for an oxygen top blowing converter in a steel plant wherein a large amount of secondary gas is thrown away, whereby the corrosion of the apparatus resulting from the dissolved oxygen in the water is considerably reduced.

We claim:

1. A process of removing oxygen from oxygen-containing feed water for use in a boiler, comprising the steps of spraying feed water at ambient temperature down into a body of feed water at ambient temperature and withdrawing feed water from the body of feed water at rates for maintaining a constant level of feed water in said body of feed water, and blowing nitrogen of at least 99.7% purity into the bottom of said body of feed water under a pressure of at least 0.2 kg./cm.$^2$ in the form of fine bubbles in an amount per unit time from 1.5 to 2 times the amount of said feed water to be treated per unit time, said amounts being measured in volumes.

2. A process as claimed in claim 1 in which the withdrawing of the feed water from the body of feed water is carried out at a velocity no greater than 10 meters per hour.

References Cited in the file of this patent

UNITED STATES PATENTS

| 1,438,581 | Claude | Dec. 12, 1922 |
| 1,722,458 | De Baufre | July 30, 1929 |
| 2,120,297 | Reinecke | June 14, 1938 |
| 2,649,166 | Porter et al. | Aug. 18, 1953 |
| 2,671,524 | Gilwood | Mar. 9, 1954 |
| 2,677,433 | Krelzschmar | May 4, 1954 |
| 2,718,275 | Banks | Sept. 20, 1955 |
| 2,774,585 | Wirts | Dec. 18, 1956 |